(12) United States Patent
Ehrmann et al.

(10) Patent No.: US 7,466,466 B2
(45) Date of Patent: Dec. 16, 2008

(54) OPTICAL SCANNING METHOD AND SYSTEM AND METHOD FOR CORRECTING OPTICAL ABERRATIONS INTRODUCED INTO THE SYSTEM BY A BEAM DEFLECTOR

(75) Inventors: Jonathan S. Ehrmann, Sudbury, MA (US); Donald B. T. Kilgus, Brighton, MI (US)

(73) Assignee: GSI Group Corporation, Billerica, MA (US)

( * ) Notice: Subject to any disclaimer, the term of this patent is extended or adjusted under 35 U.S.C. 154(b) by 241 days.

(21) Appl. No.: 11/410,684

(22) Filed: Apr. 25, 2006

(65) Prior Publication Data

US 2006/0256181 A1    Nov. 16, 2006

Related U.S. Application Data

(60) Provisional application No. 60/679,870, filed on May 11, 2005.

(51) Int. Cl.
 *G02B 26/08* (2006.01)
(52) U.S. Cl. .................................................... 359/205
(58) Field of Classification Search ................. 347/137; 359/297, 305, 205–210; 385/37, 24, 15
See application file for complete search history.

(56) References Cited

U.S. PATENT DOCUMENTS

| | | | |
|---|---|---|---|
| 2,354,614 A | 7/1944 | Reason | |
| 3,972,584 A | 8/1976 | Lobb | |
| 4,090,775 A | 5/1978 | Lobb | |
| 4,213,690 A | 7/1980 | Sugiura et al. | |
| 4,672,458 A | 6/1987 | Mckechnie | |
| 4,946,234 A | 8/1990 | Sasada et al. | |
| 4,978,860 A | 12/1990 | Bayley et al. | |
| 5,517,349 A | 5/1996 | Sandstrom | |
| 5,557,446 A | 9/1996 | Kato | |
| 5,663,747 A | 9/1997 | Shulman | |
| 5,754,328 A | 5/1998 | Cobb et al. | |
| 5,828,481 A | 10/1998 | Cobb et al. | |
| 5,900,993 A | 5/1999 | Betensky | |
| 6,281,471 B1 | 8/2001 | Smart | |
| 6,340,806 B1 | 1/2002 | Smart et al. | |
| 6,483,071 B1 | 11/2002 | Hunter et al. | |
| 6,495,791 B2 | 12/2002 | Hunter et al. | |
| 6,573,473 B2 | 6/2003 | Hunter et al. | |
| 6,639,177 B2 | 10/2003 | Ehrmann et al. | |

(Continued)

OTHER PUBLICATIONS

Dickson, Leroy D., Optical Considerations For An Acoustopitic Deflector, Applied Optics, vol. 11, No. 10, Oct. 1972, pp. 2196-2202.

*Primary Examiner*—Ricky L Mack
*Assistant Examiner*—Vipin M Patel
(74) *Attorney, Agent, or Firm*—Brooks Kushman P.C.

(57) ABSTRACT

An optical scanning method and system and method for correcting optical aberrations introduced into the system by a beam deflector are provided. The optical scanning method and system utilize a tilt-corrected, off-axis beam deflector. The scanning system includes an off-axis acousto-optic beam deflector with a walk-off angle operated at high speed and post-scan optics used to focus the scanned beam. A tilted in-scan focus plane resulting from beam width variation through the scan and the cylindrical lens effect is corrected with one or more tilted lens elements within the post-scan optical train.

27 Claims, 5 Drawing Sheets

U.S. PATENT DOCUMENTS

| | | |
|---|---|---|
| 6,662,063 B2 | 12/2003 | Hunter et al. |
| 6,703,582 B2 | 3/2004 | Smart et al. |
| 6,719,430 B2 | 4/2004 | Cotton et al. |
| 6,727,458 B2 | 4/2004 | Smart |
| 6,754,000 B2 | 6/2004 | Englehardt et al. |
| 6,775,051 B2 | 8/2004 | Sullivan et al. |
| 6,777,645 B2 | 8/2004 | Ehrmann et al. |
| 6,951,995 B2 | 10/2005 | Couch et al. |
| 6,972,268 B2 | 12/2005 | Ehrmann et al. |
| 6,989,508 B2 | 1/2006 | Ehrmann et al. |
| 7,015,418 B2 | 3/2006 | Cahill et al. |
| 7,027,155 B2 | 4/2006 | Cordingley et al. |
| 7,119,351 B2 | 10/2006 | Woelki |
| 7,148,447 B2 | 12/2006 | Ehrmann et al. |
| 7,176,407 B2 | 2/2007 | Hunter et al. |
| 7,192,846 B2 | 3/2007 | Cordingley et al. |
| 7,358,157 B2 | 4/2008 | Gu et al. |
| 2002/0012500 A1* | 1/2002 | Paek ............................ 385/37 |
| 2002/0167581 A1 | 11/2002 | Cordingley et al. |
| 2004/0134896 A1 | 7/2004 | Gu et al. |
| 2004/0144760 A1 | 7/2004 | Cahill et al. |
| 2004/0179207 A1* | 9/2004 | Svetkoff et al. ............. 356/612 |
| 2004/0188399 A1 | 9/2004 | Smart |
| 2005/0190371 A1* | 9/2005 | Knuttel ....................... 356/479 |
| 2005/0199598 A1 | 9/2005 | Hunter et al. |
| 2005/0233537 A1 | 10/2005 | Couch et al. |
| 2006/0000814 A1 | 1/2006 | Gu et al. |
| 2006/0028655 A1 | 2/2006 | Cordingley et al. |
| 2006/0086702 A1 | 4/2006 | Smart |
| 2006/0108337 A1 | 5/2006 | Gu et al. |
| 2006/0151704 A1 | 7/2006 | Cordingley |
| 2006/0186096 A1 | 8/2006 | Schramm |
| 2006/0189091 A1 | 8/2006 | Gu |
| 2006/0191884 A1 | 8/2006 | Johnson et al. |
| 2006/0192845 A1 | 8/2006 | Cordingley et al. |
| 2006/0199354 A1 | 9/2006 | Gu |
| 2006/0205121 A1 | 9/2006 | Couch et al. |
| 2006/0207975 A1 | 9/2006 | Ehrmann et al. |
| 2006/0216927 A1 | 9/2006 | Cordingley et al. |
| 2007/0031993 A1 | 2/2007 | Nemets et al. |
| 2007/0052791 A1 | 3/2007 | Cordingley et al. |
| 2007/0075058 A1 | 4/2007 | Ehrmann et al. |
| 2007/0106416 A1 | 5/2007 | Griffiths et al. |
| 2007/0117227 A1 | 5/2007 | Gu |
| 2007/0173075 A1 | 7/2007 | Lee et al. |
| 2007/0178714 A1* | 8/2007 | Gu et al. ..................... 438/795 |
| 2007/0199927 A1 | 8/2007 | Gu et al. |
| 2007/0215575 A1 | 9/2007 | Gu et al. |
| 2007/0215820 A1 | 9/2007 | Cordingley et al. |
| 2008/0011852 A1 | 1/2008 | Gu et al. |
| 2008/0035614 A1 | 2/2008 | Smart |
| 2008/0067155 A1 | 3/2008 | Gu |
| 2008/0073438 A1 | 3/2008 | Gu et al. |
| 2008/0094640 A1 | 4/2008 | Cordingley et al. |

* cited by examiner

OPTICAL SCANNING METHOD AND SYSTEM AND METHOD FOR CORRECTING OPTICAL ABERRATIONS INTRODUCED INTO THE SYSTEM BY A BEAM DEFLECTOR

CROSS REFERENCE TO RELATED APPLICATION

This application claims the benefit of U.S. provisional application Ser. No. 60/679,870, filed May 11, 2005.

BACKGROUND OF THE INVENTION

1. Field of the Invention

This invention relates to the field of optical scanning, and, more specifically, to optical scanning methods and systems for scanning with controllable beam deflectors.

2. Background Art

Figure 1A:
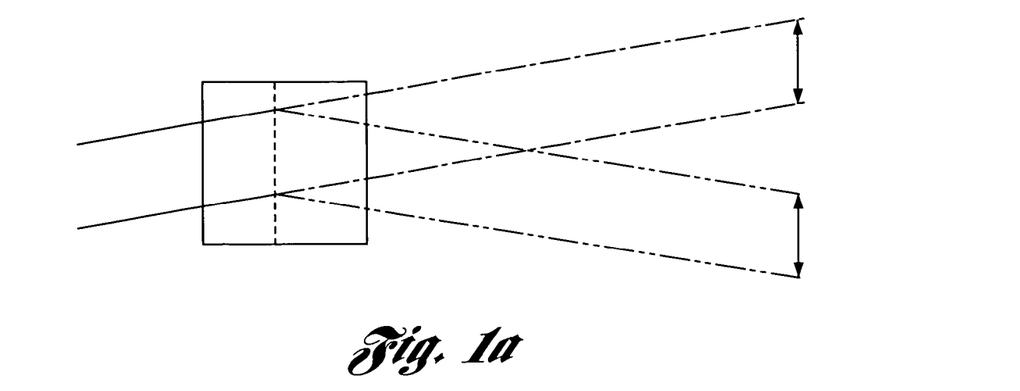
FIG. 1a is a schematic view of an on-axis AOBD.
Figure 2A:
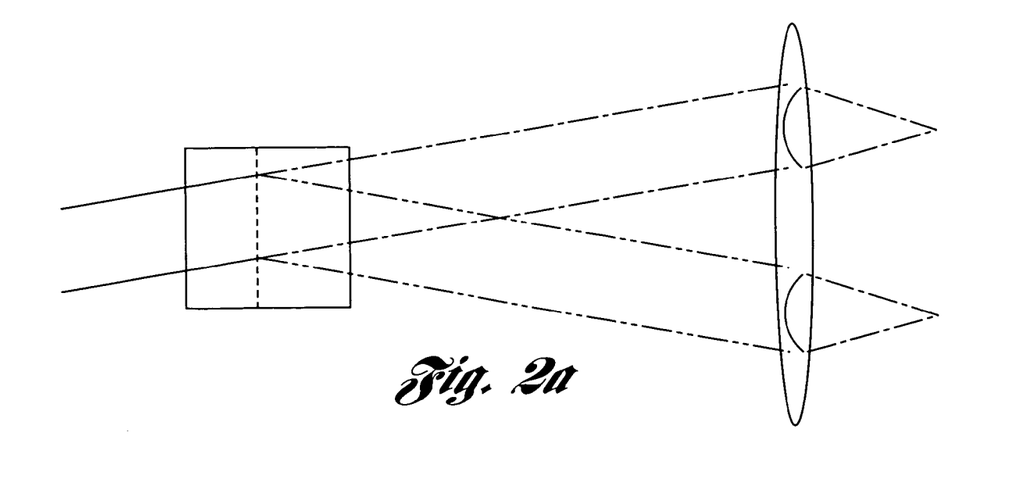
FIG. 2a is a schematic view of an on-axis AOBD with cylindrical lensing.

An Acousto-Optic Beam Deflector (AOBD) generates a scanned laser beam as shown in FIG. 1a. By varying the acoustic frequency of the AOBD, the grating period and hence deflection angle is varied. However, various aberrations can be introduced to the optical system from the AOBD. As is well known in the art of acousto-optic scanning, a cylindrical lens effect results when the grating period varies along the long axis of the oblong-shaped scan aperture during scanning as shown in FIG. 2a. As the AOBD is scanned at higher rates, variation of the grating period across the aperture increases and the lensing effect increases. Other well-known effects include the lateral chromatic dispersion of the AOBD grating which varies with scan angle, but is independent of scan rate.

Figure 1B:
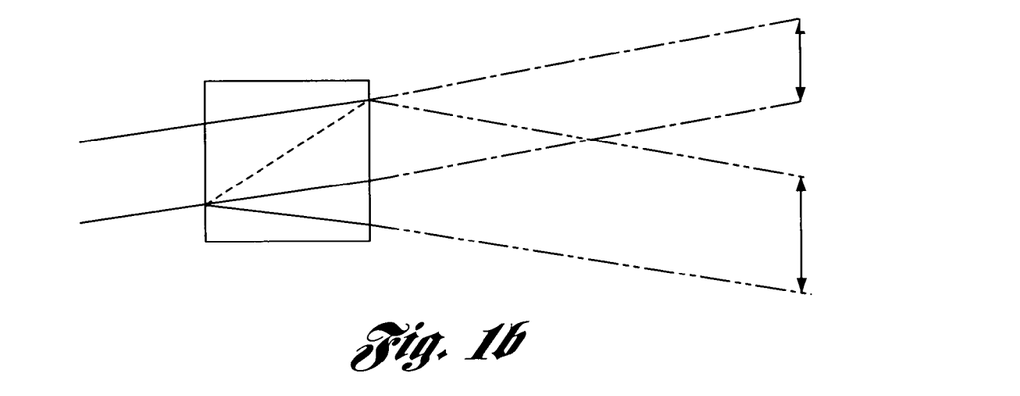
FIG. 1b is a schematic view of an off-axis AOBD with beam compression.

The so-called off-axis AOBD exhibits an acoustic walk-off angle such that the deflection is imparted at a steeply tilted active scan pupil lying within the AO crystal. This walk-off angle introduces additional aberrations to the optical system. The tilted scan pupil creates a significant variable beam width in the scan axis as shown in FIG. 1b. In the absence of cylindrical lensing, for example when the device is used to point at stationary angles, the width variation would result in an elliptical beam shape error and therefore elliptical focused spot shape variation with scan angle.

Figure 2B:
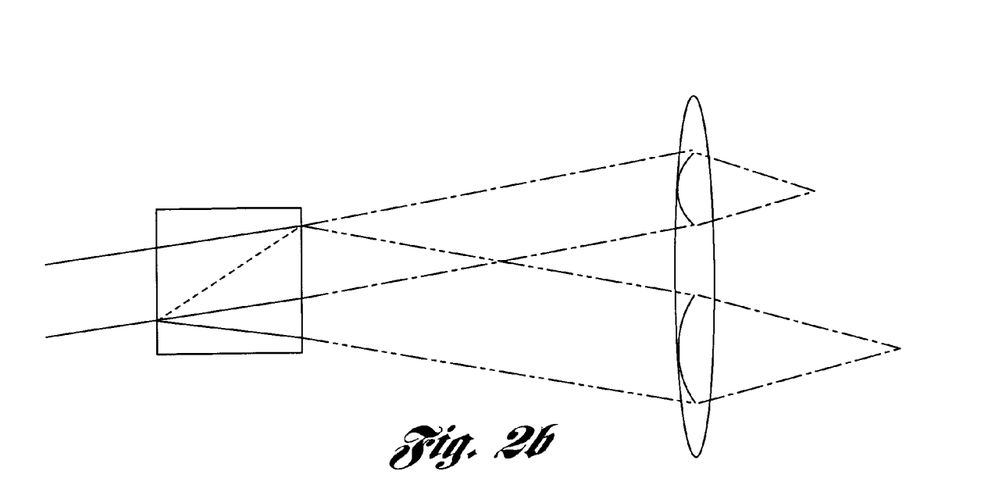
FIG. 2b is a schematic view of an off-axis AOBD with beam compression and cylindrical lensing.

However, during dynamic scanning, especially at preferred high scan rates, especially when there is significant cylindrical lensing, the lens effect aberration is compounded with the variable beam width effect. As the beam width varies through a scan, the wavefront curvature resulting from the cylindrical lensing also varies so that the effective focal length corresponding to the wavefront curvature of the cylindrical lens effect varies. This focal length variation results in a tilted in-scan focus as the beam is scanned as shown in FIG. 2b. The focus tilt is itself non-linear, so that field curvature also results. In addition to the cylindrical lens effect, focus tilt and field curvature, coma is imparted from the cylindrical focusing power located at the tilted scan pupil. By far the most significant aberration is focus tilt The various optical aberrations described with the use of the off-axis AOBD can result in larger imaged spots, out-of-round spots, and result in limits to the performance of the optical scanning system. It is therefore desirable to sufficiently mitigate the optical aberrations introduced by the off-axis AOBD to be able to achieve high speed scanning while limiting degradation of optical performance.

Sandstom in U.S. Pat. No. 5,517,349 discloses use of a prism or off-axis lens to correct for aberrations introduced by the off-axis AOBD. This method requires a deflection element after scanning the beam. The deflection element is used to reverse the beam width variation effect and thereby correct aberrations.

Engelhardt in U.S. Pat. No. 6,754,000 discloses use of an adaptive optic element to introduce wavefront correction before scanning. The pre-corrected wavefront interacts with the AOBD and phase errors are cancelled. The adaptive optic is a dynamic device, so varying correction can be applied across a scan to correct for focus tilt.

Nikoonahad in U.S. Pat. No. 5,663,747 discloses varying the chirp dispersion rate of an AOBD from a nominally corrected dispersion rate. In this way the scanned spot size at the surface of a patterned wafer is varied from a diffraction limited size by defocusing.

The following U.S. patents are related to the present invention: U.S. Pat. Nos. 2,354,614; 3,972,584; 4,090,775; 4,213,690; 4,672,458; 4,946,234; 4,978,860; 5,517,349; 5,557,446; 5,663,747; 5,754,328; 5,828,481; 5,900,993; 6,719,430; 6,754,000; and 6,775,051.

The following reference is also related to the present invention: Leroy D. Dickson, "Optical Considerations for an Acoustooptic Deflector," APPLIED OPTICS, Vol. 11, No. 10, October 1972, pp. 2196-2202.

SUMMARY OF ONE EMBODIMENT OF THE INVENTION

An aspect of the present invention provides an improved optical scanning method and system and method for correcting optical aberrations introduced into the system by a controllable beam deflector such as an off-axis AOBD.

In carrying out the above aspect and other aspects of the present invention, a method for correcting optical aberrations introduced by a controllable beam deflector of an optical scanning system is provided. The system has an optical axis and a chirp dispersion rate. The method includes tilting at least one lens element disposed between the beam deflector and an image field of the system relative to the optical axis about a cross scan axis to introduce sufficient tilt to a scan focus to at least partially correct for focus tilt introduced by the beam deflector during scanning and thereby improve imaging.

The system may have approximately no residual focus tilt after the step of tilting.

The system may have residual focus tilt after the step of tilting and wherein the method further includes either varying the chirp dispersion rate or chirp dispersion linearity until the system has approximately no residual focus tilt.

The beam deflector may be an off-axis AOBD.

The beam may be a laser beam.

The method may include detecting scanned radiation interactions with material within a target area.

The at least one lens element may include a negative cylindrical lens element with power in the scan axis.

Further in carrying out the above aspect and other aspects of the present invention, an optical scanning system which corrects for optical aberrations introduced by a beam deflector of the system is provided. The system includes a laser source to generate a laser beam, a controllable beam deflector, and a first subsystem of optical elements to deliver a scan beam to the beam deflector based on the generated laser beam. The beam deflector scans the delivered scan beam through a range of deflection angles in response to a control signal while introducing an in-scan focus tilt to the system. The system further includes a second subsystem of optical elements having an optical axis and at least one lens element tilted relative to the optical axis at a tilt angle about a cross-scan axis to at least partially correct for the focus tilt introduced by the beam deflector during scanning. The second subsystem images the scanned laser beam onto a spot on material within a target area.

The beam deflector may be an off-axis AOBD which generates a tilted in-scan focus.

The second subsystem may be an anamorphic subsystem to image a well-focused spot on the material.

The second subsystem may be a telecentric subsystem.

The second subsystem may be one of a dioptric, catoptric and catadioptric subsystem.

The tilt angle may be adjustable within a range of tilt angles.

The system may further include at least one detector to detect scanned radiation interactions with the material within the target area.

The at least one detector may include at least one of a position detector, an intensity detector and a spectrum detector.

The at least one detector may detect position and may utilize triangulation or confocal imaging.

The laser source may include a laser diode.

The at least one lens element may include a negative cylindrical lens element with power in the scan axis.

Still further in carrying out the above object and other objects of the present invention, an optical scanning method for use in an optical scanning system having an optical axis and a chirp dispersion rate is provided. The method includes providing a controllable beam deflector, providing at least one lens element tilted relative to an optical axis at a tilt angle about a cross-scan axis, generating a scan beam, and generating a control signal. The method also includes delivering the scan beam to the beam deflector. The beam deflector scans the delivered beam through a range of deflection angles while introducing an in-scan focus tilt in response to the control signal. The method further includes imaging the scanned beam onto material within a target area. The at least one tilted lens element at least partially corrects for the focus tilt introduced by the beam deflector.

The beam deflector may be an off-axis AOBD.

The beam may be a laser beam.

The method may further include detecting scanned radiation interactions with the material.

The at least one tilted lens element may include a negative cylindrical lens element with power in the scan axis.

The system may have approximately no residual focus tilt.

If the system has residual focus tilt, the method may further include varying the chirp dispersion rate or chirp dispersion linearity until the system has approximately no residual focus tilt.

In one embodiment, sufficient aberration correction can be introduced to correct the tilted focus of the high-speed off-axis AOBD without adding elements such as beam deflectors or adaptive optical elements. It is well known according to the Schiempflug principle that a tilted field can be brought into focus by appropriately tilting the objective lens. This principle is applied to remove the focus tilt introduced by the off-axis AOBD. For a post-scan optical system, located between the AOBD and the image field, it would be impractical to tilt the entire optical system. It is possible to tilt only selected elements or a single element of the post-scan optical system. The tilted element introduces sufficient tilt in the scan focus to correct the focus tilt introduced by the AOBD.

The above aspects and other aspects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 3:
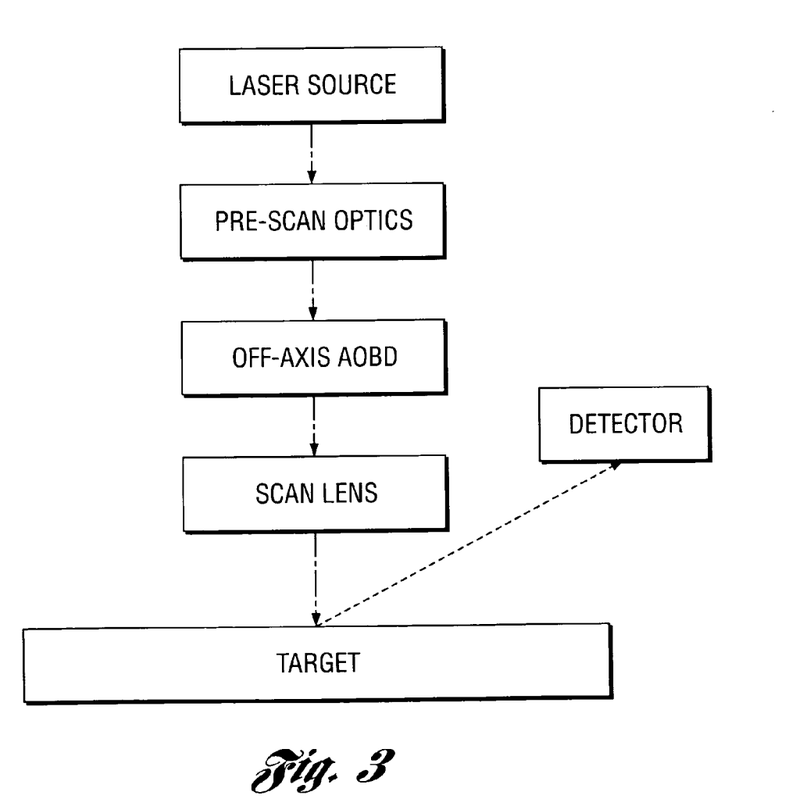
FIG. 3 is a schematic block diagram of parts of a system constructed in accordance with one embodiment of the invention.

A scanning system designed in accordance with one embodiment of the present invention is shown in FIG. 3 with an off-axis type AOBD and includes a laser source to generate a scanning beam, pre-scan optics designed to collimate, modify, and deliver a beam to the aperture of the AOBD, an off-axis AOBD to scan the beam through a range of deflection angles, and a post-scan optical system to shape and focus the scanning beam to a target area of a work piece. The system may further include one or more detectors to detect scanned radiation interactions with the target area. The detectors may detect position, intensity, or spectrum. Position detection may include triangulation or confocal imaging.

The laser source may be any type with a suitable beam quality, power, polarization, wavelength, and temporal characteristics according to the scanning application and the properties of the AOBD. For metrology applications such as 3 dimensional imaging, the laser has sufficient power to provide a strong detection signal without adversely affecting the target area material properties, for example a modulated 785 nm CW laser diode of about 80 milliwatts.

The pre-scan optics may use various commercially available optical elements including diode collimating lenses, and may include beam shaping optical elements, such as gratings, prisms, or beam expansion telescopes, to provide a scan beam with a cross section profile filling at least a portion of the AOBD aperture. Preferably, the scan beam will be well collimated and will substantially fill the design aperture of the AOBD. Preferred laser sources, such as laser diodes, may have a significant optical bandwidth, and in this case lateral dispersion should be taken into account. Preferably, the pre-scan optics includes a correcting dispersive element, for example a blazed diffraction grating, to offset the average dispersion effect of the AOBD. Preferably, the pre-scan optics will align the laser source polarization as needed to the off-axis AOBD aperture.

The AOBD may be any type that generates a tilted in-scan focus, but is preferably an off-axis type made with a TEO2 crystal. Off-axis TEO2 devices are commercially available from Crystal Technology, Inc. and from Isomet.

The post-scan optical system images the scan beam deflected at the scan pupil in the AOBD onto a spot at the target field on a work piece. To reshape the scan beam, for example when well-focused round spots are required, the post-scan optical system will be an anamorphic type. The anamorphic system will generally contain one or more cylindrical elements. The post-scan optical system may include an internal image with a beam waist in at least one axis. There may be a spatial filter to spatially filter the beam at the internal image. For some metrology applications, the post-scan optical system may be telecentric. Generally the post-scan optical system will be dioptric, however it may be catoptric, or catadioptric. Generally the elements will be refractive elements having spherical and cylindrical surfaces, however they may also include diffractive surfaces, aspheric surfaces, phase surfaces, holographic surfaces, and other types of optical surfaces known to focus light.

The post-scan optical system also includes at least one tilted focusing element to correct for in-scan focus tilt. The element is tilted relative to the optical axis of the post-scan optical system about the cross scan axis so that the field tilt introduced by the off-axis AOBD is substantially corrected. As is well-known in the field of optical design, a focusing element may be tilted near a nodal point so that deflection does not result. For thin lens elements, the nodal points are at the element, and simply tilting the element will not substantially deflect the beam. Depending on the thickness and material of the focusing element, an offset may result. Preferably the tilted element is a negative cylindrical element with power in the scan axis, so that the cross-scan focus is substantially unaffected.

In addition to the optical scanning elements shown in FIG. 3, the system may further include a material handling system for positioning a work piece relative to the scanning system. Such a system includes a system controller, system control software, a data processing unit, a data storage unit and an operator interface as is known in the art.

In one embodiment of the invention, a laser diode is collimated with a molded aspheric lens and shaped with a combination of a reflection grating and anamorphic prisms to fill the aperture of an off-axis TEO2 AOBD with a beam of about 2 mm×8 mm.

The AOBD has an input angle of about 8.7 degrees, a characteristic acute walk-off angle of 57.3 degrees and a full scan field of about 5.3 degrees, and a 25 mm field is scanned with a telecentric beam. The cylindrical lens effect is calculated based on the scan rate and other factors, but an effective cylindrical lens focal length of about 1400 mm is typical.

The performance of the AOBD is modeled in a ray tracing program such as ZEMAX-EE by immersing a diffraction grating and a cylindrical phase surface in TEO2 material at the walk-off angle. Scanning of the beam is accomplished by varying the period of the grating in multiple (e.g. zoom) configurations. With a representative ray trace of the AOBD performance, modifications of the scan lens to correct the evident focus tilt can be made and evaluated.

Figure 4A:
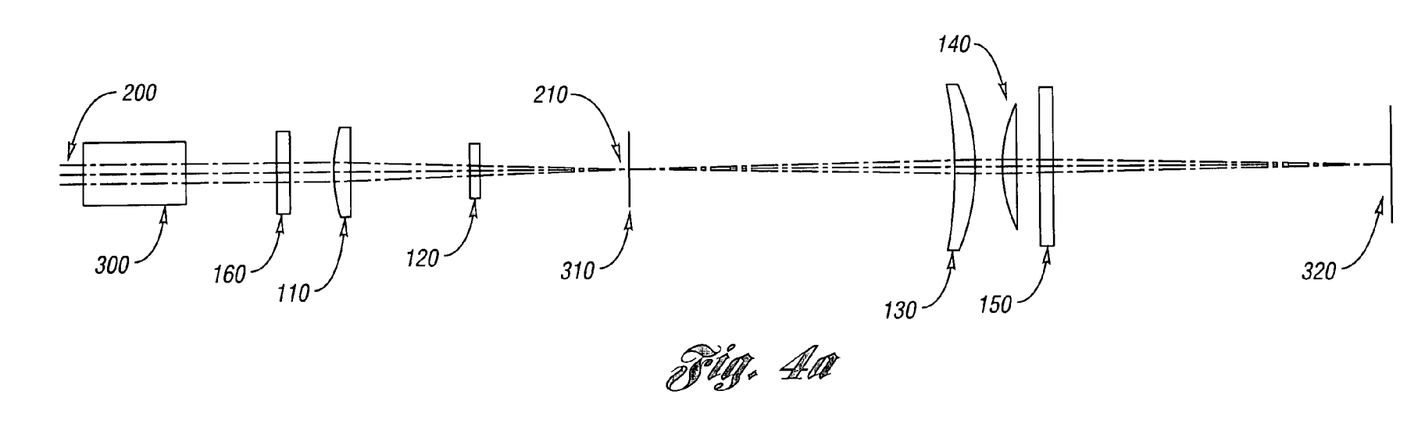
FIG. 4a is a schematic view of an exemplary scan lens and AOBD in the cross-scan axis.
Figure 4B:
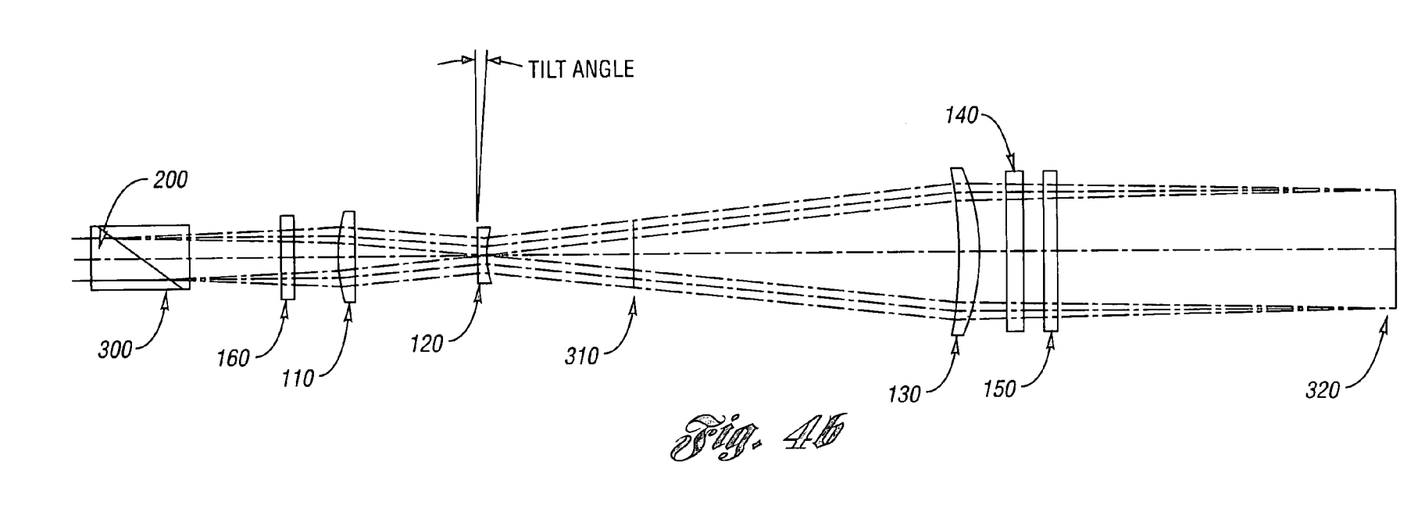
FIG. 4b is a schematic view of an exemplary scan lens and AOBD in the scan axis.

Preferably, and referring now to FIGS. 4a and 4b, the post-scan optical system is a scan lens of a refractive design including a first positive spherical lens element 110, a second negative cylindrical lens element 120 with optical power in the scan direction, a third positive spherical lens element 130 and a fourth positive cylindrical lens element 140 with optical power in the cross scan axis. Preferably, the second element 120 of the scan lens is tilted with respect to the optical axis of the scan lens to substantially correct the AOBD aberrations.

The function of an exemplary scan lens can be understood by considering each anamorphic axis independently. Referring again to FIG. 4a, in the cross scan axis, the first element 110 condenses a laser beam 200 to a beam waist 210. The second element 120 transmits without power in the cross scan axis. At the beam waist 210 between the second element 120 and the third element 130, a spatial filter 310 removes unwanted energy. After the internal image, the beam diverges and is at least partially collimated by the third element 130 at the desired output diameter, the first and third elements 110 and 120, respectively, functioning substantially as a Keplerian beam expander. The fourth element 140 focuses the cross-scan beam onto a target 320. The scan beam exits the lens through a planar window 150. The preferred scan lens also includes a polarization isolator element 160 between the AOBD 300 and the scan lens, a cross-scan spatial filter, and an output window.

In the scan axis, referring again to FIG. 4b, the first and second elements 110 and 120 function together as a reversed Galilean telescope scan expander, compressing the beam from the AOBD 300 close to the desired output diameter and magnifying the scan angle. The second element 120 is tilted at a tilt angle with respect to the optical axis of the scan lens to substantially correct the AOBD aberrations. The third element 130 collimates the scanned beam to produce a substantially telecentric scan and focuses the compressed beam to the target 320. The fourth element 140 transmits the beam, but has no power in the scan axis. The scan beam exits the lens through the planar window 150.

Considering both the in-scan and cross-scan axes together, it will be apparent to one skilled in the art that the focal lengths of first, second and third lens elements 110, 120 and 130, respectively, are used to constrain the output beam diameter, beam aspect ratio, and the overall scan lens focal length. The focal length of the fourth element 140 is determined by the first three lens elements 110, 120 and 130 to remove the residual astigmatic focus.

Figure 5A:
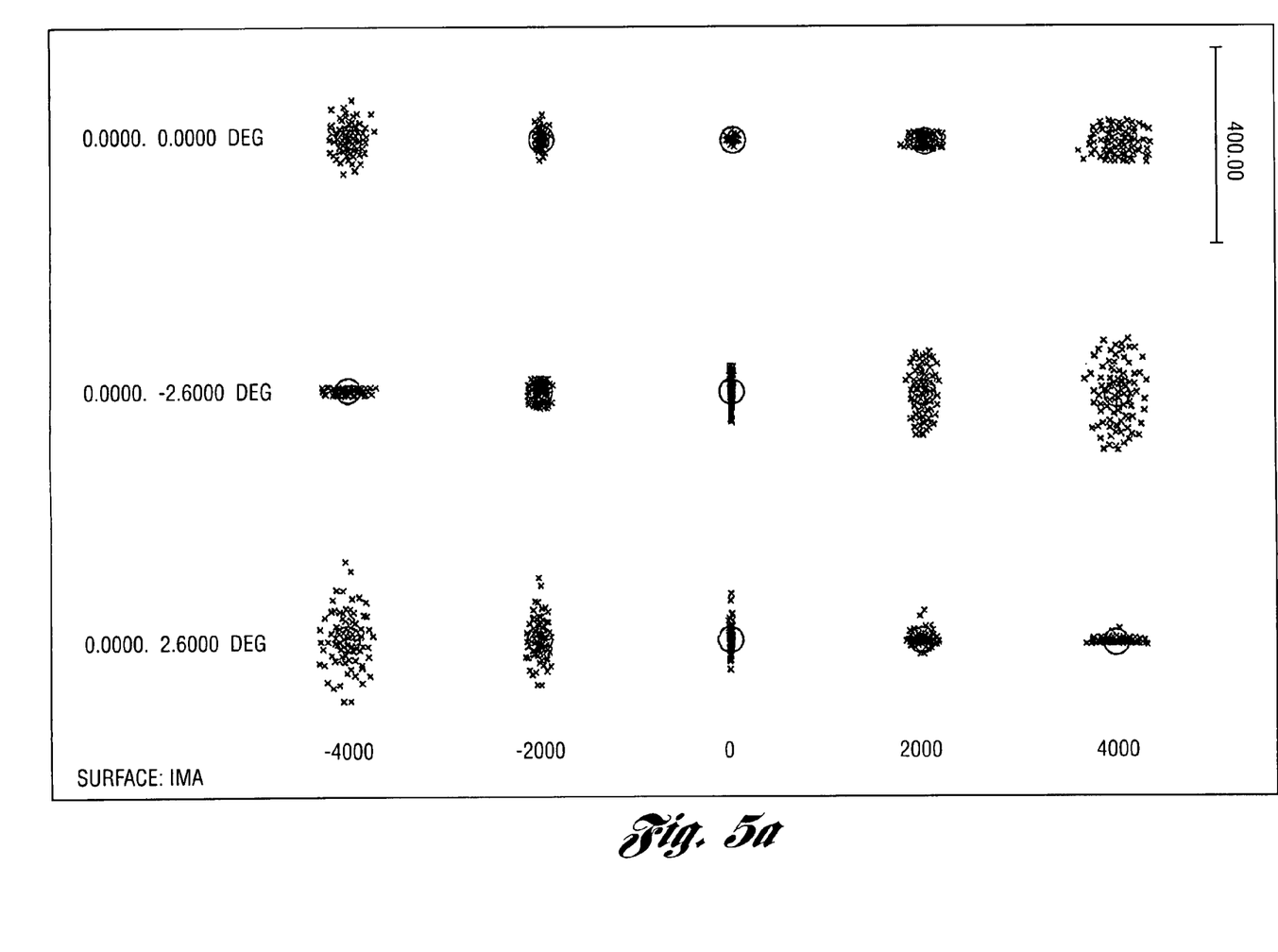
FIG. 5a illustrates spot diagrams using an exemplary scan lens without tilt correction.

For focus tilt introduced by the AOBD 300, correction is needed only in the scan direction. Conveniently, the second element 120 of this exemplary scan lens is a strong cylinder lens with power in the scan axis. Tilting of this lens 120 by a small amount, for example <3 degrees, is sufficient to correct for field tilt. The orientation and magnitude of the tilt are determined by the scan direction, acoustic wave propagation direction and chirp rate. Preferably the cylindrical lensing is positive power and the lens 120 is tilted such that the lens edge is closer to the AOBD 300 on the wider beam side and further from the AOBD 300 on the narrower beam side System performance can be evaluated by considering the spot diagram relative to the diameter of the Airy disc. FIG. 5a shows a spot diagram of the exemplary scan lens through focus with no tilted element. It is apparent that there is significant under-corrected focus tilt as seen by the poor focus at full scan angles, with better focus above and below for the respective extreme scan angles.

Figure 5B:
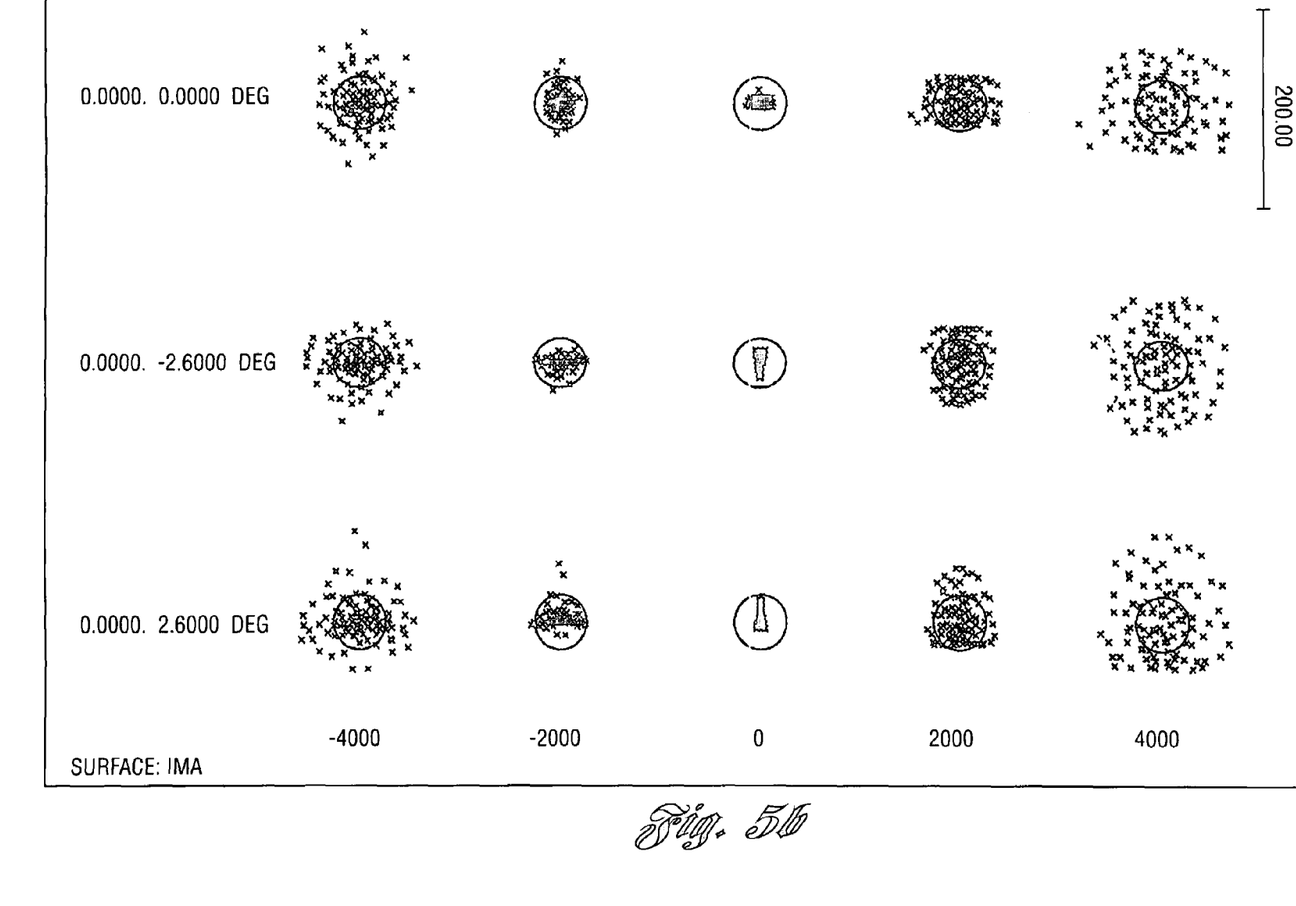
FIG. 5b illustrates spot diagrams using an exemplary scan lens with 1.6 degree tilt correction.

Now consider FIG. 5b showing the same spot diagram after a tilt of the second element 120. In this case tilting the element 120 by 1.6 degrees shows spots smaller than the Airy disc at the nominal focus across the scan field, indicating that correction provided is sufficient to provide improved imaging.

It is to be understood that other scan lens configurations or post-scan optical system configurations may be used between the AOBD scan pupil and the image field with at least one tilted element to substantially correct for off-axis AOBD field tilt. For example optical devices such as relay lenses or anamorphic relay lenses may be used to reshape the beam and/or modify the scan angle in conjunction with an anamorphic or spherical scan lens. However, at least one relay element or scan lens element is tilted.

The amount of field tilt introduced by the off-axis scanning AOBD is a function of chirp rate. It may be desirable for a system to be capable of performing at multiple chirp rates, for example if electronic data rate requirements differ for different applications or different feature types. Thus, the degree of tilt of an optical element required to correct the field tilt may also vary. A provision for variable optical element tilt is described where the tilt may be manually or automatically adjusted to compensate for the field tilt resulting from multiple chirp rates.

The relationship between frequency chirp rate and field tilt correction may also be exploited to achieve a coarse/fine correction as follows. An optical element to be tilted may be mounted at approximately the design tilt angle required to correct the field tilt of a system. Manufacturing variations in optical element radii, AOBD parameters, and/or mechanical mounting parts may result in some amount of residual field tilt after nominal correction. This residual field tilt may be fully corrected effectively by a "fine adjustment" of the correction by manipulating the frequency chirp by one of two methods until the amount of field tilt error more precisely matches the amount of actual correction provided by the tilted element.

The first method comprises varying the chirp rate while keeping the chirp linear. The second method comprises the imparting of a non-linearity to the chirp, the result of which will be a focal plane curvature which can approximately correct the residual focal tilt. While the first method is simpler to implement, it will result in either a different total frequency chirp range or different time elapsed during the scan. The second method maintains frequency chirp range and elapsed time during the scan.

In summary, a system and method of scanning a laser beam with a beam deflector is described. Initially, a laser beam is directed into the aperture of a deflector. Then the beam is scanned with the beam deflector wherein scanning the beam generates an aberrated scanned beam. Finally, the scanned beam is delivered and focused to a target plane with a post-scan optical system. The post-scan optical system includes at least one tilted element. The delivering and focusing corrects at least some aberration generated by scanning the beam, thereby improving imaging.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for correcting optical aberrations introduced by a controllable beam deflector of an optical scanning system, the system having an optical axis and a chirp dispersion rate, the method comprising:
   providing a post scan optical system including a plurality of lens elements between the beam deflector and an image field of the system; and
   tilting at least one but not all of the lens elements relative to the optical axis about a cross scan axis to introduce sufficient tilt to a scan focus to at least partially correct for focus tilt introduced by the beam deflector during scanning and thereby improve imaging.

2. The method as claimed in claim 1 wherein the system has approximately no residual focus tilt after the step of tilting.

3. The method as claimed in claim 1 wherein the system has residual focus tilt after the step of tilting and wherein the method further comprises varying the chirp dispersion rate until the system has approximately no residual focus tilt.

4. The method as claimed in claim 1 wherein the system has residual focus tilt after the step of tilting and wherein the method farther comprises varying chirp dispersion linearity until the system has approximately no residual focus tilt.

5. The method as claimed in claim 1 wherein the beam deflector is an off axis AOBD.

6. The method as claimed in claim 1 wherein the beam is a laser beam.

7. The method as claimed in claim 1 further comprising detecting scanned radiation interactions with material within a target area.

8. The method as claimed in claim 1 wherein the at least one lens element includes a negative cylindrical lens element with power in the scan axis.

9. An optical scanning system which corrects for optical aberrations introduced by a beam deflector of the system, the system comprising:
   a laser source to generate a laser beam;
   a controllable beam deflector;
   a first subsystem of optical elements to deliver a scan beam to the beam deflector based on the generated laser beam, the beam deflector scanning the delivered scan beam through a range of deflection angles in response to a control signal while introducing an in-scan focus tilt to the system; and
   a second subsystem of optical elements including lens elements having an optical axis and at least one, but not all, of the lens element being tilted relative to the optical axis at a tilt angle about a cross-scan axis to at least partially correct for the focus tilt introduced by the beam deflector during scanning, the second subsystem imaging the scanned laser beam onto a spot on material within a target area.

10. The system as claimed in claim 9 wherein the beam deflector is an off-axis AOBD which generates a tilted in-scan focus.

11. The system as claimed in claim 9 wherein the second subsystem is an anamorphic subsystem to image a well-focused spot on the material.

12. The system as claimed in claim 9 wherein the second subsystem is a telecentric subsystem.

13. The system as claimed in claim 9 wherein the second subsystem is one of a dioptric, catoptric and catadioptric subsystem.

14. The system as claimed in claim 9 wherein the tilt angle is adjustable within a range of tilt angles.

15. The system as claimed in claim 9 further comprising at least one detector to detect scanned radiation interactions with the material within the target area.

16. The system as claimed in claim 15 wherein the at least one detector includes at least one of a position detector, an intensity detector and a spectrum detector.

17. The system as claimed in claim 15 wherein the at least one detector detects position utilizing triangulation or confocal imaging.

18. The system as claimed in claim 9 wherein the laser source includes a laser diode.

19. The system as claimed in claim 9 wherein the at least one lens element includes a negative cylindrical lens element with power in the scan axis.

20. An optical scanning method for use in an optical scanning system having an optical axis and a chirp dispersion rate, the method comprising:
   providing a controllable beam deflector;
   providing a plurality of lens elements between the beam deflector at an image field of the system, at least one but not all of the lens elements being tilted relative to an optical axis at a tilt angle about a cross-scan axis;

generating a scan beam;

generating a control signal;

delivering the scan beam to the beam deflector, the beam deflector scanning the delivered beam through a range of deflection angles while introducing an in-scan focus tilt in response to the control signal; and imaging the scanned beam onto material within a target area, the at least one tilted lens element at least partially correcting for the focus tilt introduced by the beam deflector.

21. The method as claimed in claim 20 wherein the beam deflector is an off-axis AOBD.

22. The method as claimed in claim 20 wherein the beam is a laser beam.

23. The method as claimed in claim 20 further comprising detecting scanned radiation interactions with the material.

24. The method as claimed in claim 20 wherein the at least one tilted lens element includes a negative cylindrical lens element with power in the scan axis.

25. The method as claimed in claim 20 wherein the system has approximately no residual focus tilt.

26. The method as claimed in claim 20 wherein the system has residual focus tilt and wherein the method further comprises varying the chirp dispersion rate until the system has approximately no residual focus tilt.

27. The method as claimed in claim 20 wherein the system has residual focus tilt and wherein the method further comprises varying chirp dispersion linearity until the system has approximately no residual focus tilt.

* * * * *

UNITED STATES PATENT AND TRADEMARK OFFICE
CERTIFICATE OF CORRECTION

PATENT NO. : 7,466,466 B2  Page 1 of 1
APPLICATION NO. : 11/410684
DATED : December 16, 2008
INVENTOR(S) : Jonathan S. Ehrmann et al.

It is certified that error appears in the above-identified patent and that said Letters Patent is hereby corrected as shown below:

Column 8, Line 3, Claim 4:

Delete "farther" and insert -- further --.

Signed and Sealed this

Seventeenth Day of March, 2009

JOHN DOLL
*Acting Director of the United States Patent and Trademark Office*